UNITED STATES PATENT OFFICE.

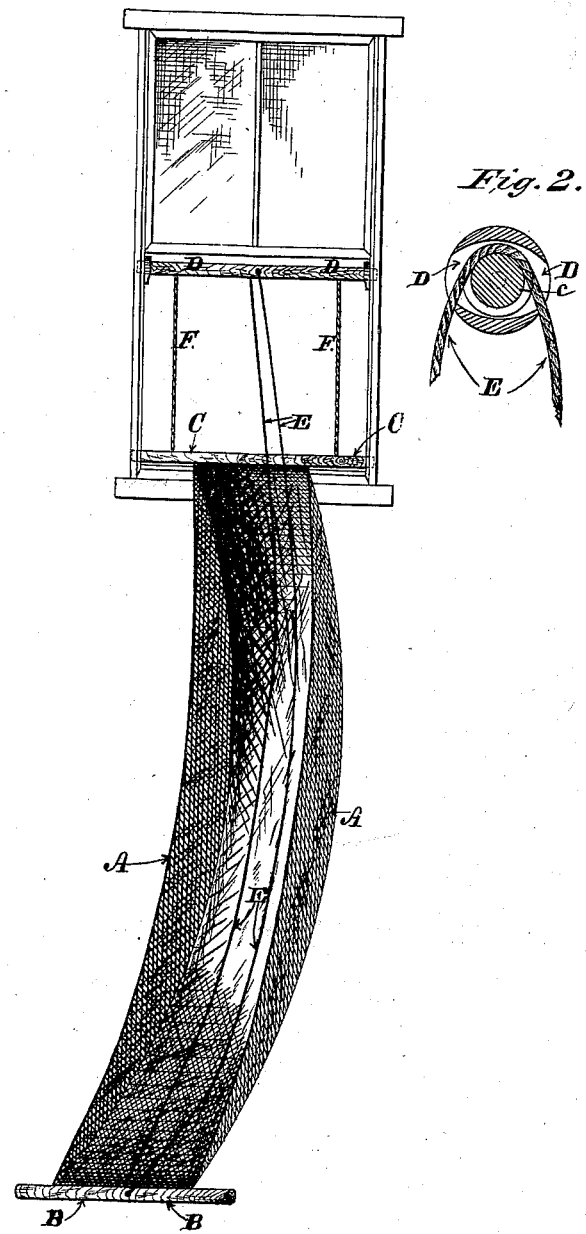

CORNELIA A. SHELDON, OF AMITY, NEW YORK.

IMPROVEMENT IN FIRE-ESCAPES.

Specification forming part of Letters Patent No. 201,455, dated March 19, 1878; application filed December 13, 1877.

*To all whom it may concern:*

Be it known that I, CORNELIA A. SHELDON, of the town of Amity, in the county of Allegany and State of New York, have invented a new and useful Improvement in Fire-Escapes, of which the following is a specification:

Figure 1 of the accompanying drawing represents a perspective view of my design, and Fig. 2 is a detail sectional view of the roller and endless band.

A is a boat-shaped carrier, of canvas or other material, impregnated in some suitable fire-proof preparation, of sufficient length, when thrown from the window of the building from which it is used, to reach the ground and be held out in a diagonal position by some person below, thus holding and sustaining the body of the person descending. B is a bar or roller, of metal or wood, to which the lower end of the canvas carrier is attached, and which is to be thrown from the window, carrying the canvas carrier to the ground. C is a similar bar or roller, to which the upper end of the canvas carrier is attached, and which sustains it by being placed across the lower part of the inside of the window by its length, or by being placed in brackets. D is a third similar bar or roller, attached to bar or roller C by cords or chains F, to be placed across the window, in brackets on each side of the inside of the window sufficiently high to allow the person descending to pass between it and bar C. Passing over a suitable pulley, c, E is an endless band, of suitable material, passing through the center of bar or roller D, extending the length of the canvass carrier A and passing through the center of bar or roller B, to be used as a guide into the canvas carrier and to control the descent to the ground.

The operation of my invention is as follows: The bar or roller B, attached to the lower end of the canvas carrier A, is thrown from the window, carrying the canvas carrier A to the ground. The bars or rollers C and D, placed across the inside of the window by their length and resting in brackets, sustain the upper part of the canvass carrier in the window. The person descending takes hold of the endless band E for a guide into the canvas carrier A, and to control the velocity of the descent.

The advantages of my fire-escape are that it is simple in construction, easily manipulated—a child can place it in the window ready for use, and it can be furnished at a moderate rate.

What I claim is—

The open canvas carrier A, in combination with the bars or rollers B C and the bar or roller D and endless band E, when arranged for operation, substantially as shown and described.

December 10, 1877.

CORNELIA A. SHELDON.

In presence of—
WILKES AUGST,
ESTHER C. GRANBY.